United States Patent

[11] 3,590,849

| [72] | Inventor | Levi J. F. Austin |
| --- | --- | --- |
| | | Orton-on-the Hill, Atherstone, England |
| [21] | Appl. No. | 835,149 |
| [22] | Filed | June 20, 1969 |
| [45] | Patented | July 6, 1971 |
| [73] | Assignee | Clear Hooters Limited |
| | | Bedworth, Nuneaton, England |
| [32] | Priority | June 22, 1969 |
| [33] | | Great Britain |
| [31] | | 29,878 |

[54] VACUUM SERVOCONTROL SYSTEMS
3 Claims, 4 Drawing Figs.

| [52] | U.S. Cl. | 137/116.5 |
| --- | --- | --- |
| [51] | Int. Cl. | F16k 31/365 |
| [50] | Field of Search | 137/82, 85, 116.5 |

[56] References Cited
UNITED STATES PATENTS

| 2,811,314 | 10/1957 | Lund | 137/85 X |

*Primary Examiner*—Alan Cohan
*Attorney*—Scrivener, Parker, Scrivener and Clarke ABSTRACT: In a vacuum modulating valve in which the pressure in an outlet chamber is controlled by a diaphragm having an axial stem engaged in an opening in a blade spring anchored at one end and cooperating at its free end with a cam for adjustment, a rigid washer located on said stem between the spring and a radial flange on the extremity of the stem is connected to the spring by means permitting relative rocking movement but preventing relative displacement in a direction lengthwise of the spring.

PATENTED JUL 6 1971 3,590,849
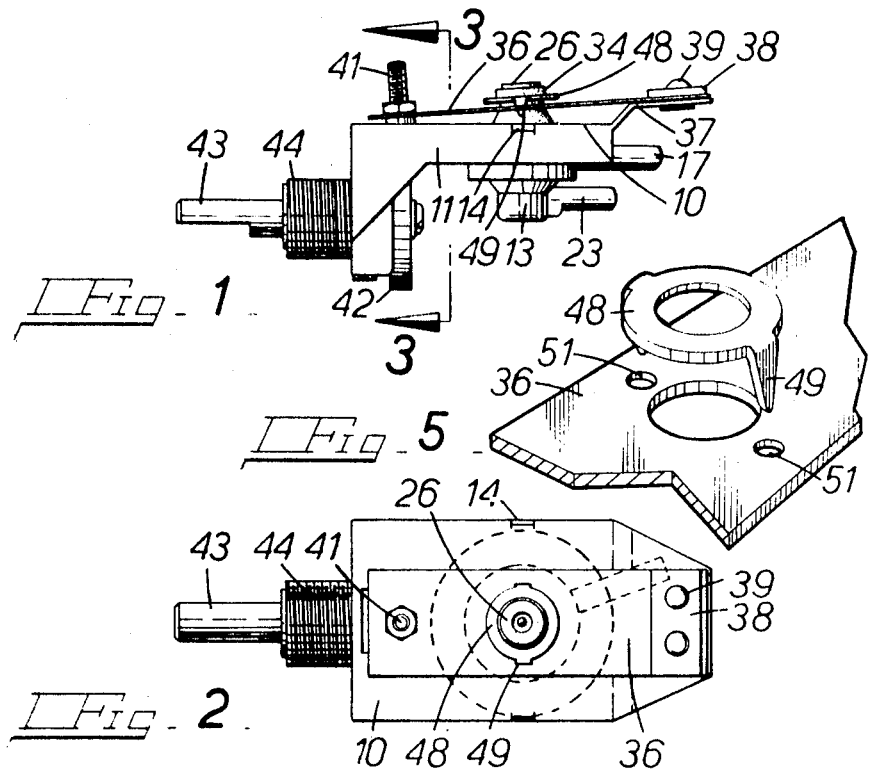
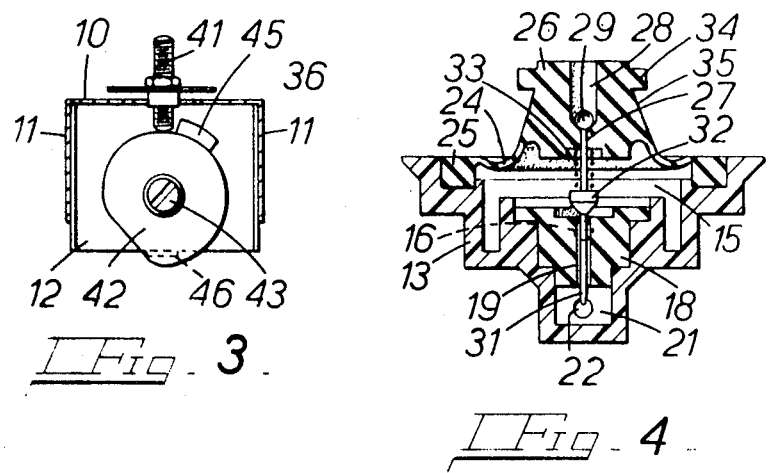

VACUUM SERVOCONTROL SYSTEMS
vacuum-modulating

This invention relates to improvements in valves for use in servosystems in which a source of vacuum or low-pressure is used to provide the power for causing mechanical movements through the medium of fluid pressure motors such as piston and cylinder assemblies or flexible diaphragms.

Where the servosystem is used on a vehicle the vacuum source is usually the manifold of the engine and control is provided by a manually operated vacuum-modulating valve.

Our invention is concerned with a vacuum-modulating valve of the kind in which a valve body incorporates an outlet chamber and inlet and outlet connections, a diaphragm exposed on one side to atmosphere and on the other side to the pressure in the outlet chamber, and a valve member controlling the inlet and a passage through the diaphragm in accordance with the position of the diaphragm.

The diaphragm is supported against atmospheric pressure by a flat beam or blade spring fixed at one end and engaged at the other by an angularly movable cam of which the position is adjusted by a manually operated control. The diaphragm has a hollow sleeve part or stem which extends upwardly through a clearance opening in the spring and on its upper end the stem has a radial shoulder or flange between which and the spring washer is arranged so that the diaphragm follows the movement of the spring both upwardly and downwardly.

In practice it has been found that there is a certain amount of hysteresis effect, the degree of vacuum obtained in the outlet chamber for a given position of the control lever being slightly different according to whether the lever has been moved into that position from a vacuum-increasing or vacuum-decreasing direction.

It is believed that this is due to a certain amount of sliding movement between the washer and the spring which varies the effective spacing of the axis of the stem of the diaphragm from the anchored end of the spring.

According to our present invention, in a vacuum-modulating valve of the kind set forth a rigid metal or other washer is located on the stem of the diaphragm between the spring and a shoulder or flange on the upper end of the stem, and the washer is connected to the spring in such a manner that a limited rocking movement between the washer and stem and the spring is permitted but any relative displacement in a direction lengthwise of the spring is prevented.

A vacuum modulating valve incorporating our invention is illustrated by way of example in the accompanying drawings in which:

FIG. 1 is a side elevation of the complete unit,

FIG. 2 is a plan,

FIG. 3 is a section on the line 3–3 of FIG. 1,

FIG. 4 is a vertical section of the valve body, and

FIG. 5 is a perspective view of the washer and the part of the blade spring with which it cooperates.

In the valve illustrated the frame or mounting 10 of the valve is a sheet metal pressing comprising a flat mounting surface with cranked side flanges 11 between which at one end is an end wall 12 having side flanges spot-welded or otherwise secured to the flanges 11.

The valve body 13 is a plastic moulding of the form shown in section in FIG. 4, and its open upper end is secured against the underside of the mounting surface of the frame 10 by tags 14 pierced from the pressing.

Within the body there is an outlet chamber 15 having in its peripheral wall an opening 16 leading into an outlet tube 17 adapted to be connected to a fluid pressure motor to be controlled. A rubber gland member 18 is housed in an axial recess in the lower part of the body and has a small bore axial passage 19 through it connecting the outlet chamber 15 to an inlet chamber 21. An opening 22 in the sidewall of the chamber 21 leads into an inlet tube 23 adapted to be connected to a source of vacuum.

The upper end of the body is closed by a rubber diaphragm 24 exposed on its underside to the pressure in the outlet chamber 15. A thickened peripheral lip 25 on the diaphragm is clamped between the frame 10 and an annular shoulder in the body.

A central boss 26 on the diaphragm extends upwardly through an opening of substantial diameter in the frame, the central boss 26 and peripheral lip 25 formed integrally with and of the same material as the rubber diaphragm 24. An axial passage 27 of small diameter extends upwardly from the bottom end of the boss into a bore 28 of greater diameter extending downwardly from the upper end of the boss, the lower end of the bore 28 providing a seat for a ball 29 on the upper end of a valve pin 31 extending downwardly through the passage 27 and through the passage 19 in the gland member 18. Above the gland member 18 the pin carries a coned collar 32 for which a seat is formed by the upper end of the passage 18.

The valve pin is loaded by a light spring 33 urging it downwardly.

The upper end of the boss 26 on the diaphragm is formed with a radially projecting flange 34 below which is a tapered neck 35.

This part of the boss being rubber is deformable and may thus be passed through a hole in a flat blade spring 36 of which one end is secured to an upwardly joggled extension 37 of the frame by a clamping strip 38 and rivets 39. Adjustably mounted in the other end of the spring is a screw-threaded pin 41 of which the lower end bears on the periphery of a cam 42. The cam is mounted on the inner end of a spindle 43 rotatably mounted in a bush 44 secured in the end wall of the frame. The outer surface of the bush may be screw-threaded so that it can serve for mounting the valve in an opening in a panel or other part. A stop defining the angular movement of the cam in either direction is formed by a radial finger 45 on the spindle cooperating with a lug 46 turned up from the bottom of the end wall.

A metal washer 48 is fitted over the upper end of the boss 26 on the diaphragm below the radial flange 34. The washer is a tight fit on the neck 35 and has at opposite ends of a diameter at right angles to the length of the spring downwardly cranked tapered tags 49 which are received in holes 51 pierced in the spring. The relative dimensions of the tags and the holes are such that when the tags have entered into the holes as far as they can go there is sufficient clearance between the washer and the upper surface of the spring to allow for limited relative rocking movement between the spring and the washer and the boss on the diaphragm in a direction transverse to the length of the spring.

The diameter of the opening in the spring which receives the neck 35 of the boss on the diaphragm is such that the neck is a tight fit in the opening, and the spring and boss move upwardly and downwardly together.

When the cam is in the off position and the free end of the spring 36 is in its lowermost position the diaphragm lies in such a position that the collar 32 on the valve pin is seated by the spring 33 against the upper end of the passage 19 and cuts off the outlet chamber 15 in the valve body from the inlet connected to vacuum. The ball 29 on the upper end of the valve pin is clear of the upper end of the passage 27 in the diaphragm and the outlet chamber is at atmospheric pressure.

Upon rotation of the cam the free end of the spring 36 is raised and the spring raises the diaphragm until the ball 29 seats on the lower end of the bore 28 and closes the passage 27. At the same time the collar 32 on the valve pin is withdrawn from the upper end of the passage 19 so that vacuum is applied to the outlet chamber 15. The vacuum creates a pressure differential across the diaphragm 24 which moves downwardly under the atmospheric pressure on its upper side and against the resistance of the spring 36 which acts to counter the pressure differential. An equilibrium position is reached when the vacuum existing in the outlet chamber is balanced by the loading applied to the diaphragm by the spring 36.

The spring loading can be varied by angular adjustment of the cam and the vacuum existing in the outlet chamber and applied to the fluid pressure motor to be controlled can be set within close limits over a wide range.

I claim:

1. A vacuum-modulating valve comprising a valve body incorporating an outlet chamber adapted to be connected to a fluid pressure motor and an inlet adapted to be connected to a source of vacuum, a diaphragm exposed on one side to atmosphere and on the other side to the pressure in the outlet chamber, a valve member controlling the inlet and a passage through the diaphragm in accordance with the position of the diaphragm, and a blade spring fixed at one end and engaged at the other by an angularly movable cam of which the position is adjustable manually, the diaphragm having a hollow axial stem which extends through a clearance opening in the spring and having on its extremity a radial flange between which and the spring a washer is located to cause the diaphragm to move with the spring against the resilient resistance provided by the spring, said washer being rigid and the connected to the spring by means permitting limited rocking movement between the washer and the stem and spring but preventing any relative displacement in a direction lengthwise of the spring.

2. A vacuum-modulating valve as in claim 1 wherein the washer, which is of metal, is a tight fit on the stem of the diaphragm and has at opposite ends of a diameter at right angles to the length of the spring cranked tapered tags which are received in holes pierced in the spring.

3. A vacuum-modulating valve as in claim 2 wherein the relative dimensions of the tags on the washer and the holes in the spring are such that when the tags have entered into the holes as far as they can go there is sufficient clearance between the washer and the spring to allow limited rocking movement between the spring and the washer and the stem of the diaphragm in a direction transverse to the length of the spring. as far as they can go there is sufficient clearance between the washer and the spring to allow limited rocking movement between the spring and the washer and the stem of the diaphragm in a direction transverse to the length of the spring.